US007356601B1

(12) United States Patent
Clymer et al.

(10) Patent No.: US 7,356,601 B1
(45) Date of Patent: Apr. 8, 2008

(54) METHOD AND APPARATUS FOR AUTHORIZING NETWORK DEVICE OPERATIONS THAT ARE REQUESTED BY APPLICATIONS

(75) Inventors: Andrew M. Clymer, Chippenham (GB); Kaushik Narayan, Chennai (IN)

(73) Assignee: Cisco Technology, Inc., San Jose, CA (US)

( * ) Notice: Subject to any disclaimer, the term of this patent is extended or adjusted under 35 U.S.C. 154(b) by 800 days.

(21) Appl. No.: 10/325,783

(22) Filed: Dec. 18, 2002

(51) Int. Cl.
*G06F 15/16* (2006.01)

(52) U.S. Cl. .................. 709/229; 709/223; 709/225

(58) Field of Classification Search ............ 709/203, 709/223, 225, 229
See application file for complete search history.

(56) References Cited

U.S. PATENT DOCUMENTS

| | | | | |
|---|---|---|---|---|
| 5,968,176 | A * | 10/1999 | Nessett et al. ............. | 726/11 |
| 6,219,790 | B1 * | 4/2001 | Lloyd et al. ............... | 726/14 |
| 6,298,383 | B1 * | 10/2001 | Gutman et al. ............ | 709/229 |
| 2003/0131113 | A1 * | 7/2003 | Reeves et al. ............. | 709/229 |
| 2003/0191966 | A1 * | 10/2003 | Gleichauf .................. | 713/201 |

OTHER PUBLICATIONS

Cisco Systems, Inc., "TACACS+ Attribute-Value Pairs," undated, pp. SC-497-SC-512.

Cisco Systems, Inc., "Cisco—TACACS+ and RADIUS Comparison," 2003, 9 pages.

Cisco Systems, Inc., "Cisco—Basic TACACS+," 2003, 6 pages.

D. Carrel, "The TACACS+ Protocol, Version 1.78," Jan. 1997, pp. 1-42.

Cisco Systems, Inc., "TACACS+ Attribute-Value Pairs," undated, pp. SC-497-SC-512, no date.

* cited by examiner

*Primary Examiner*—Kenny Lin
(74) *Attorney, Agent, or Firm*—Hickman Palermo Truong & Becker LLP

(57) ABSTRACT

A method of authorizing network device operations that are requested by applications is disclosed. A request for authorization from a network management application is received. The request identifies a user who is using the network management application to interact with a network device, the network management application that is seeking to execute one or more application tasks on a network device, the device, and the application tasks. A determination whether the specified user is authorized to execute the application tasks on the device is made. A success message is sent to the application only when the specified user is authorized to execute the application tasks on the device. Other embodiments support authorizing one application task against a plurality of devices or device groups. TACACS+ may be used for communication. A TACACS+ server that can support application authorization, and associated extensions to the TACACS+ protocol, are described.

34 Claims, 8 Drawing Sheets

METHOD AND APPARATUS FOR AUTHORIZING NETWORK DEVICE OPERATIONS THAT ARE REQUESTED BY APPLICATIONS

FIELD OF THE INVENTION

The present invention generally relates to data processing in the field of network management. The invention relates more specifically to a method and apparatus for authorizing network device operations that are requested by applications.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Enterprise network management is undergoing an architectural shift from solutions based on single servers to solutions based on distributed appliances and applications. Future network management solutions are expected to comprise a management network consisting collaborative appliances and management servers. Security for such a management network will be a critical factor.

Security in the management domain translates to providing management stations with authentication, authorization and accounting ("AAA") services. Further, there is a need to provide strong security for communication links among the management stations. This need includes strong security for web access to a management station, strong security for inter-station communication and strong security for communication among management stations and devices.

Authentication, authorization, and accounting servers ("AAA servers") are widely d for authorizing use of network devices, such as routers, switches, gateways, and others. FIG. 1A is a block diagram illustrating a simplified network arrangement in which an AAA server is used. A user 102 is associated with a terminal 104 or other host that hosts a network management system 105A. The terminal 104 is communicatively coupled to a network 106, which may be a local network, wide area network, or one or more internetworks.

An AAA server 120 also is communicatively coupled to the network 106. A commercial example of AAA server 120 is CiscoSecure for UNIX, Cisco Access Control Server (ACS), and Cisco Access Registrar, all offered by Cisco Systems, Inc., San Jose, Calif. A network management server 105B may process requests received from network management system 105A, which is a client of the server 105B.

Network management products have had role-based access control (RBAC) authorization frameworks that work independent of device authorization mechanisms like RADIUS and TACACS+. As a result, enterprises that have deployed both an AAA server and a network management system have had to use separate servers to define authorization policy. For example, a TACACS+server is used for device authorization, and the network management application server is used for application authorization. This is undesirable because it is not unified; the approach requires an enterprise to deploy separate authorization policies on each server. These policies may conflict, or personnel may fail to establish the same policy on each server. Further, it is desirable to have a single point of administration for both application and device authorization policy.

An additional problem with this approach is that an application cannot determine, in a simple way, whether a user is authorized to perform a set of commands across multiple devices, such as devices in an authorization group. There is a need for an approach that is more scalable and can permit determining authorization for numerous commands across numerous devices in a single transaction.

There is a need to have a single point of administration for device command administration as well as application authorization.

In particular, there is a need for a way to provide application authorization in addition to the device authorization in the context of a network with an AAA server. It would be desirable to provide a solution to these problems within the context of existing authorization protocols.

One or more network devices 108 are within the network 106 or connected to the network. Each such network device 108 hosts an operating system 112 that includes or hosts, among other elements, an agent 110. The network device 108 is identified by a Media Access Control (MAC) address 108A and an Internet Protocol (IP) address 108B. The AAA server can communicate with network device 108 and other elements using a messaging protocol tailored for AAA functions, such as RADIUS or TACACS+. Functions of operating system 112 and device 108 are accessible using terminal 104 using a command-line interface (CLI) provided by the operating system.

To illustrate conventional operation of a system having this arrangement, assume that user 102 wishes to configure network device 108 in a particular way by executing a CLI configuration command on the device. The user 102 establishes a connection of terminal 104 to a management interface of device 108. The user 102 enters the desired CLI command. In response, agent 110 issues a request, typically in the form of a message that conforms to RADIUS or TACACS+, that requests AAA server 120 to determine whether the user is authorized to perform the requested command on the device. The message identifies the user and requested command. The message also implicitly identifies the device in that the source IP address of the message is the device IP address 108B. Based on the source IP address, user identifier, and requested command, AAA server 120 determines whether authorization is proper, and issues either a Success or Fail response message. If the response is Success, device 108 executes the requested command.

In current implementations of TACACS+, an authorization request issued by a device has the following general format:

user = <user issuing the command>
service=shell
cmd=cmd1
   cmd-arg*cmd1-arg1
   cmd-arg*cmd1-arg2 wherein "user" identifies a user who is issuing a command to a device, "service" has the value "shell" to identify a terminal shell interface, "cmd1" is a command of a command-line interface of a network device operating system, and "cmd1-arg1" and "cmd1-arg2" are first and second arguments of the command. However, using such a request, a device can authorize only one command at one time. Further, implicitly there is only one device against the authorization can be checked. Network management applications now require the ability to support multiplicity, i.e., a single authorization request should be able to support authorization multiple devices and multiple permissions.

Thus, in past approaches, a network device has issued the request for authorizing execution of a command on the device by a particular user. There has been no way for an application, such as network management system 105, to request authorization from an AAA server for execution of a particular command on a device by a user of the application.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1A:
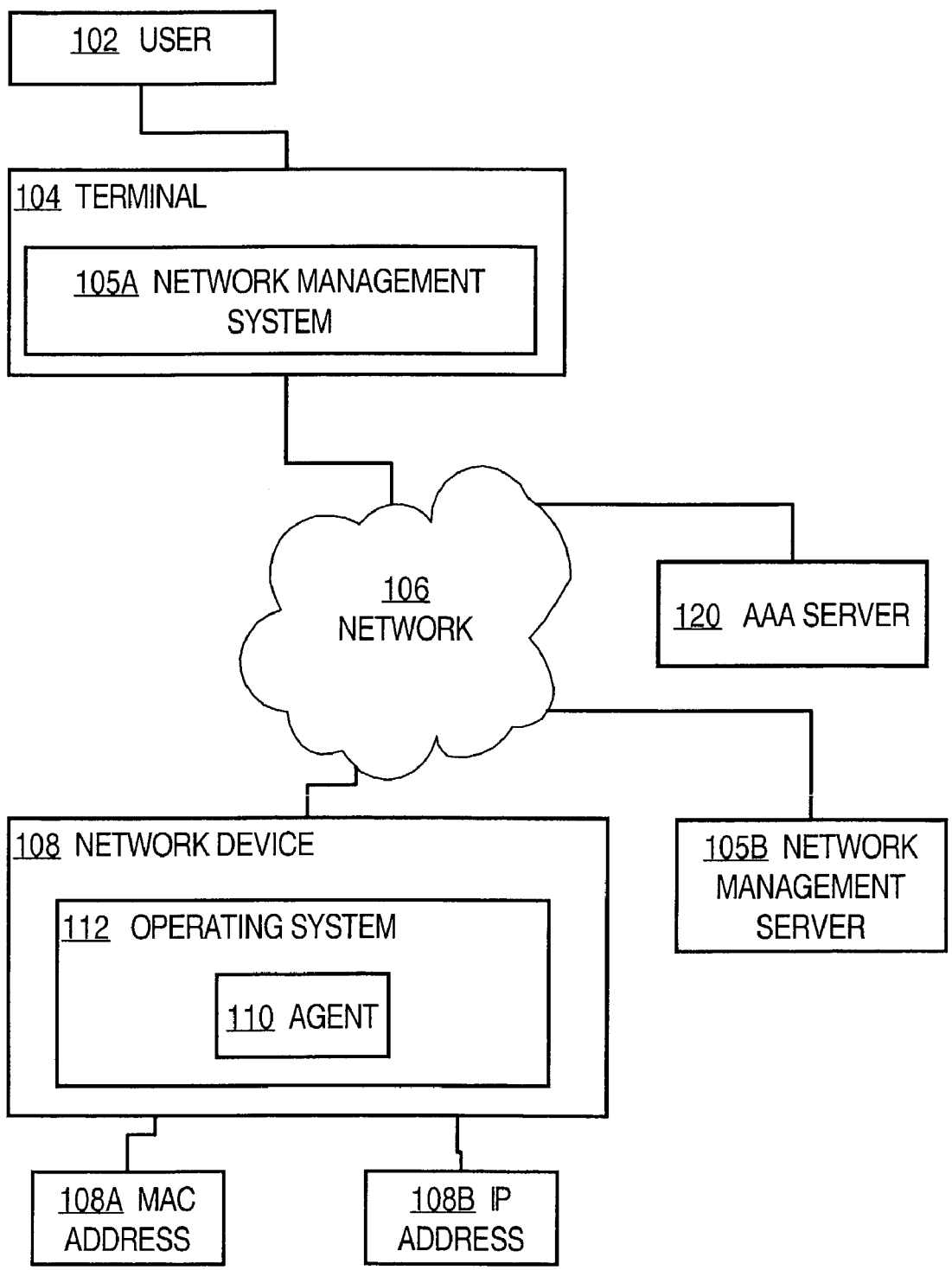
FIG. 1A is a block diagram illustrating a simplified network arrangement in which an AAA server is used.

A method and apparatus for authorizing network device operations that are requested by applications is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Application Authorization Approach
3.0 Security in a Distributed Management Domain
　3.1 General Architectural Concepts
　3.2 Authorization Query Process
　3.3 Synchronizing Device Information
　3.4 User Identity Model
　3.5 Security Services
　3.7 Kerberos Approach
4.0 Implementation Mechanisms-Hardware Overview
5.0 Extensions and Alternatives 1.0 GENERAL OVERVIEW The needs identified in the foregoing Background, and other needs and objects that will become apparent for the following description, are achieved in the present invention, which comprises, in one aspect, a method for authorizing network device operations that are requested by applications. In one embodiment, an authentication, authorization and accounting (AAA) server or access control server provides application authorization. A request for authorization from a network management application is received. The request for authorization identifies a user who is using a network management application to manage a network device, a network management application that consists of one or more application tasks that operate on the device, the device, and the one or more application tasks. A determination whether the specified user is authorized to execute the application tasks on the device is made. A success response message is sent to the requesting application only when the specified user is authorized to execute one or more application tasks on the device. Other embodiments support authorizing one application task against a plurality of devices or device groups. The TACACS+ protocol may be used for authorization communication. A TACACS+ server that can support application authorization, and extensions to the TACACS+ protocol to support application authorization, are described.

In other aspects, the invention encompasses a computer apparatus and a computer-readable medium configured to carry out the foregoing steps.

In one embodiment, a device administration security server or TACACS+ server provides application authorization. The disclosure describes a TACACS+ server that can support application authorization and describes extensions to the TACACS+ protocol to support application authorization.

2.0 APPLICATION AUTHORIZATION APPROACH

According to one embodiment, an application authorization approach is provided. In one specific embodiment, the concept of a "service" as specified in TACACS+ is used to differentiate application authorization from device authorization. Each application that uses application authorization with an AAA server under TACACS+ server has a unique TACACS+ service identifier.

The AAA server is configured to provide support for application authorization. In one feature, the AAA server provides support for application roles in addition to CLI roles. The roles are partitioned based on the TACACS+ service value. CLI roles use the "shell" service. In another feature, the AAA server provides the ability for applications to register a service name, application permissions and (optionally) default role definitions. In yet another feature, the AAA server provides the ability for a user interface plug-in to edit application permissions to define user-defined roles. The AAA server provides open access to administrative device grouping information, including information specifying which devices are contained in groups.

Information communicated from the AAA server to a network management server may use any transport mechanism that can transport TACACS+ messages or RADIUS messages. In one embodiment, HTTP-based import/export mechanisms are used.

Figure 1B:
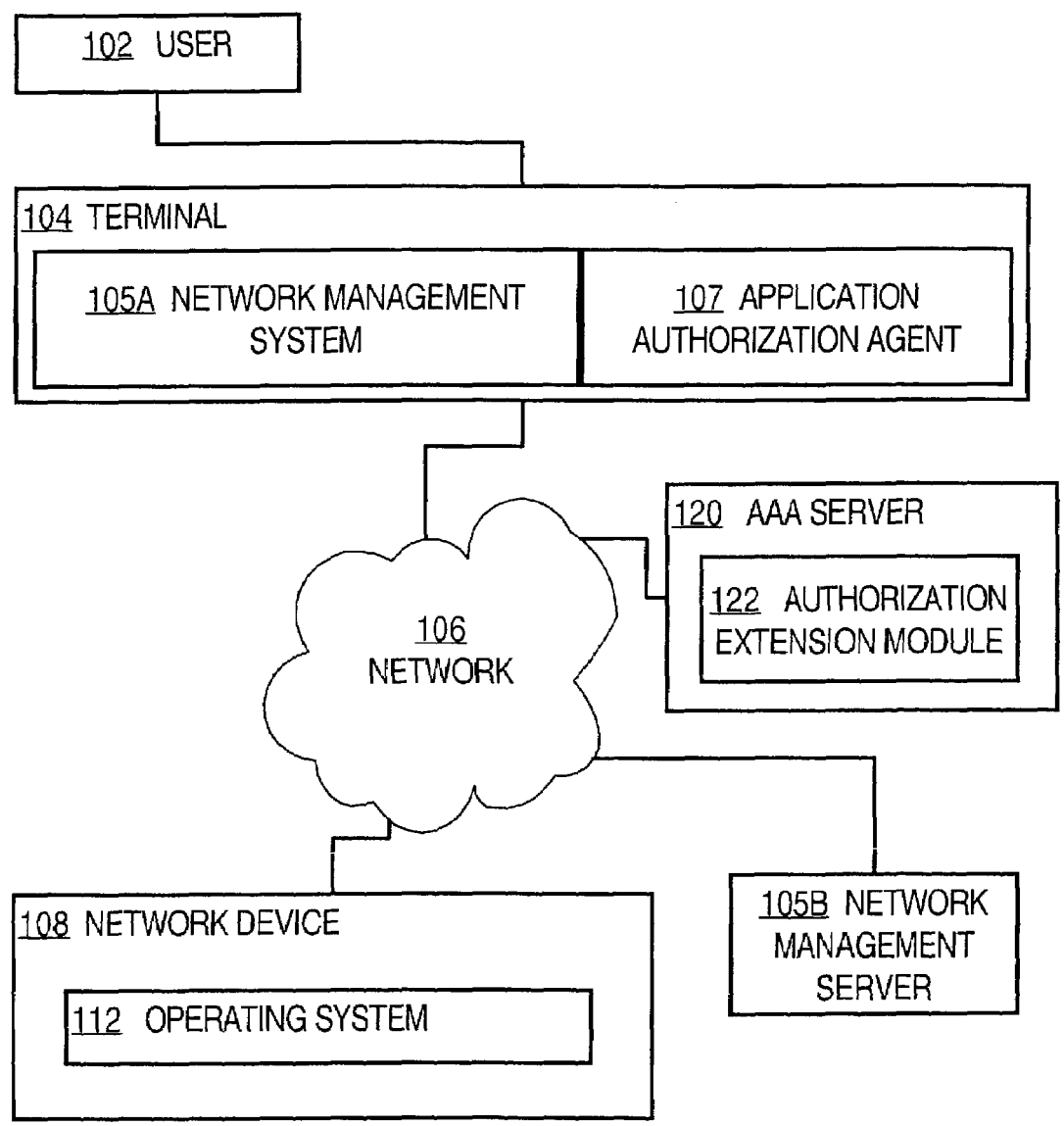
FIG. 1B is a block diagram of network arrangement providing application authorization.

FIG. 1B is a block diagram of network arrangement providing application authorization and configured to provide the capabilities described above. A user 102 is associated with a terminal 104 or other host that hosts a network management system 105. An application authorization agent 107 ("agent 107") is hosted by or integrated with network management client 105A. The terminal 104 is communicatively coupled to a network 106, which may be a local network, wide area network, or one or more internetworks.

An AAA server 120 also is communicatively coupled to the network 106. A commercial example of AAA server 120 is Cisco Access Control Server (ACS) from Cisco Systems, Inc., San Jose, Calif. AAA server 120 includes an authorization extension module 122 that can interact with agent 107 using an agreed-upon protocol. In one embodiment, module 122 and agent 107 communicate using TACACS+; however, other embodiments may use RADIUS or other protocols.

A network management server 105B is communicatively coupled to network 106, and can service network management requests received from network management system 105A. Thus, network management system 105A and network management server 105B form a client-server system that processes network management functions. For purposes of illustrating a simple example, FIG. 1B shows only one user 102 interacting with one terminal 104 and one instance of network management system 105A. However, in a practical embodiment, there may be any number of users interacting with any number of distributed instances of the network management system.

One or more network devices 108 are within the network 106 or connected to the network. Each such network device 108 hosts an operating system 112. Functions of operating system 112 and device 108 are accessible using terminal 104 using a command-line interface (CLI) provided by the operating system.

Figure 2A:
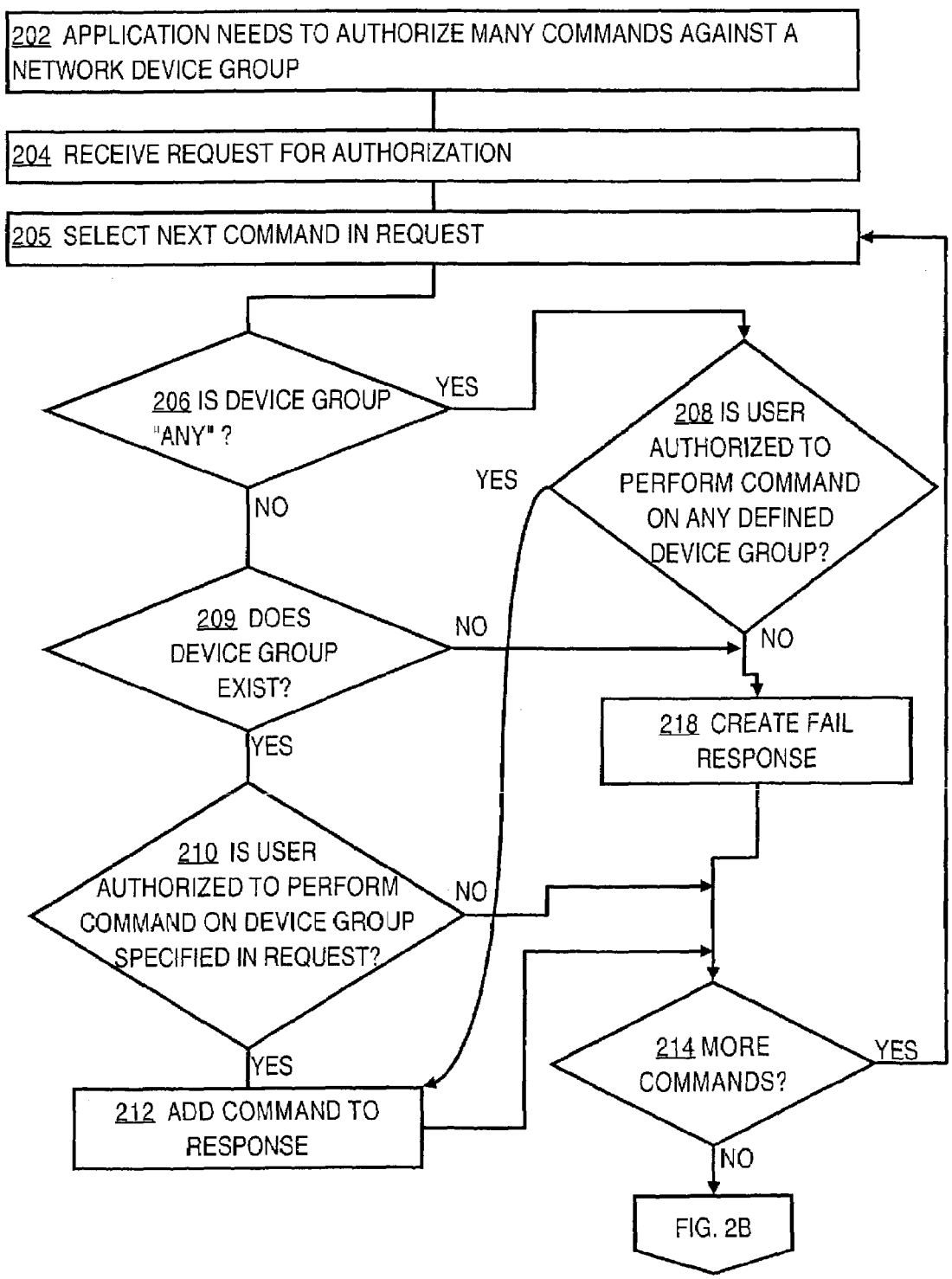
FIG. 2A is a flow diagram of a process of authorizing, for an application, many commands against a network device group.
Figure 2B:
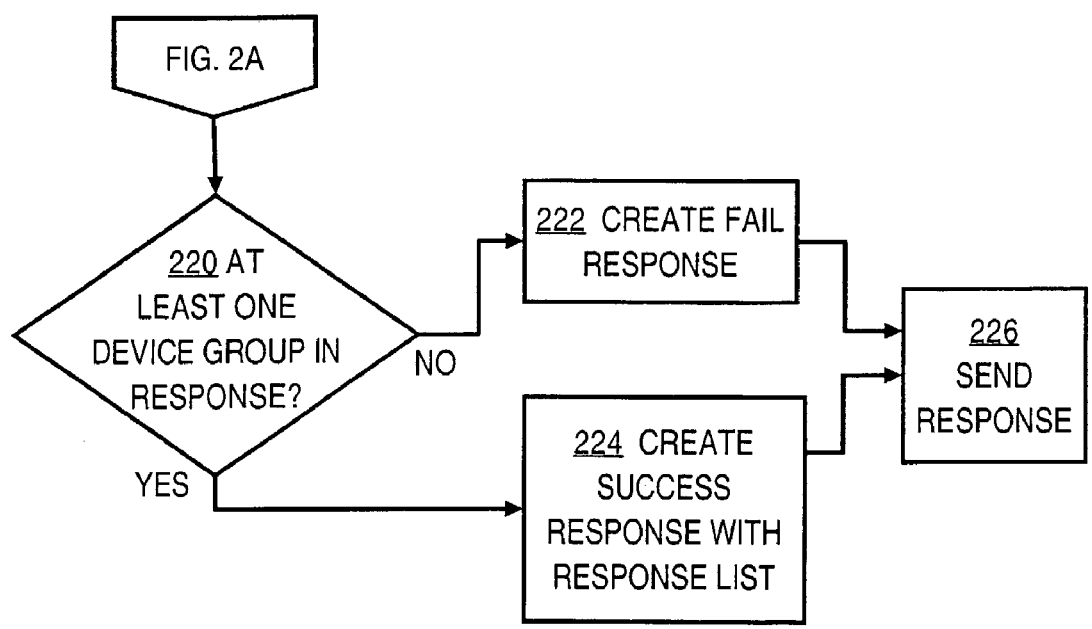
FIG. 2B is a flow diagram of additional steps in the process of FIG. 2A.

FIG. 2A is a flow diagram of a process of authorizing, for an application, many application tasks against a network device group, and FIG. 2B is a flow diagram of additional steps in the process of FIG. 2A. Referring first to FIG. 2A, as indicated by block 202, the process of FIG. 2A is used when an application needs to authorize many application tasks against a network device group.

In block 204, a request for authorization is received from an application. For example, AAA server 120 of FIG. 1B receives a TACACS+ request from network management system 105A. In one specific embodiment, to authorize a set of permissions against a TACACS+ administrative network device group or devices, the following type of request is issued:

user = <User logged on to the NM application>
    service=<Application_Service_Name>
    authorize-deviceGroup=<DEVICE GROUP> or
        authorize-device=<DEVICE NAME>
    cmd*cmd1
    cmd-arg*cmd1-arg1
    cmd-arg*cmd1-arg2
    cmd*cmd2
    . . . .
    cmd*cmdN In a request with this format, "user" identifies a user who is logged on to a network management application, "service" identifies the network management application or a service within it, "cmd1" is an application task, expressed in the form of a command of a command-line interface of a network device operating system, and "cmd1-arg1" and "cmd1-arg2" are first and second arguments of the application task. Further, the star character ("*") denotes an optional argument, whereas an equal sign ("=") in other requests denotes a mandatory argument. In a specific embodiment using TACACS+, a maximum of 253 application tasks are allowed in a single request. The value "authorize-deviceGroup/authorize-device" can specify a device group name, device name or the value ANY. When the value ANY is provided, authorization permissions are checked on any device and device group that is defined in the AAA server.

Referring again to FIG. 2A, a request for authorization is processed at the AAA server as shown in block 205 through block 218. In block 205, the next application task in the request is selected. In the above example request, "cmd1" is selected, and a subsequent iteration of block 205 selects "cmd2."

In block 206, a test is performed to determine whether the device group specified in the request has a value of "ANY." If so, then in block 208, a test is performed to determine whether the user specified in the request is authorized to perform the requested application task on any device or device group that is then currently defined in the AAA server. If no such authorization is available, then in block 218, a Fail response is created. Alternatively, the requested application task is added to a Success response, as shown by block 212. Response processing is described further in the paragraphs below.

If the test of block 206 is negative, so that "ANY" is not specified, then in block 209, a test is performed to determine whether the device group specified in the request exists in then-current definitions of device groups that are maintained by the AAA server. If the specified device group does not exist, then control is passed to block 218, in which a Fail response is created.

If the specified device group exists, then control passes to block 210, in which the process determines whether the specified user is authorized to perform the specified application task on the specified device group. Conventional AAA techniques implemented by AAA server 120 may be used. If authorization exists, then in block 212, the specified application task is added to the response. In one specific embodiment that uses TACACS+, the response has the following format:

service=<service same as request>
    authorize-deviceGroup=<Device Group Same as request>
    cmd=authorized_cmd1
    cmd-arg=authorized_cmd1-arg1
    cmd-arg=authorized_cmd1-arg2
    cmd=authorized_cmd2
    . . .
    cmd=authorized_cmdN No user identification is necessary. Instead, the service name informs a service within an application that it is authorized to perform the application tasks that are identified in the response.

After block 212, and if an authorization failure occurs at block 210, control reaches block 214, in which a test is performed to determine if the request contains additional application tasks. If so, then control passes to block 205, to iterate through the next application task in the request.

Referring now to FIG. 2B, if all devices in the request have been processed, then in block 220, a test is performed to determine whether the response contains at least one device. If the response has no devices, then in block 222, a Fail response is created. If at least one device is in the response, then in block 224, a Success response is created with a list of devices. In block 226, the response is sent to the requesting process.

Figure 3:
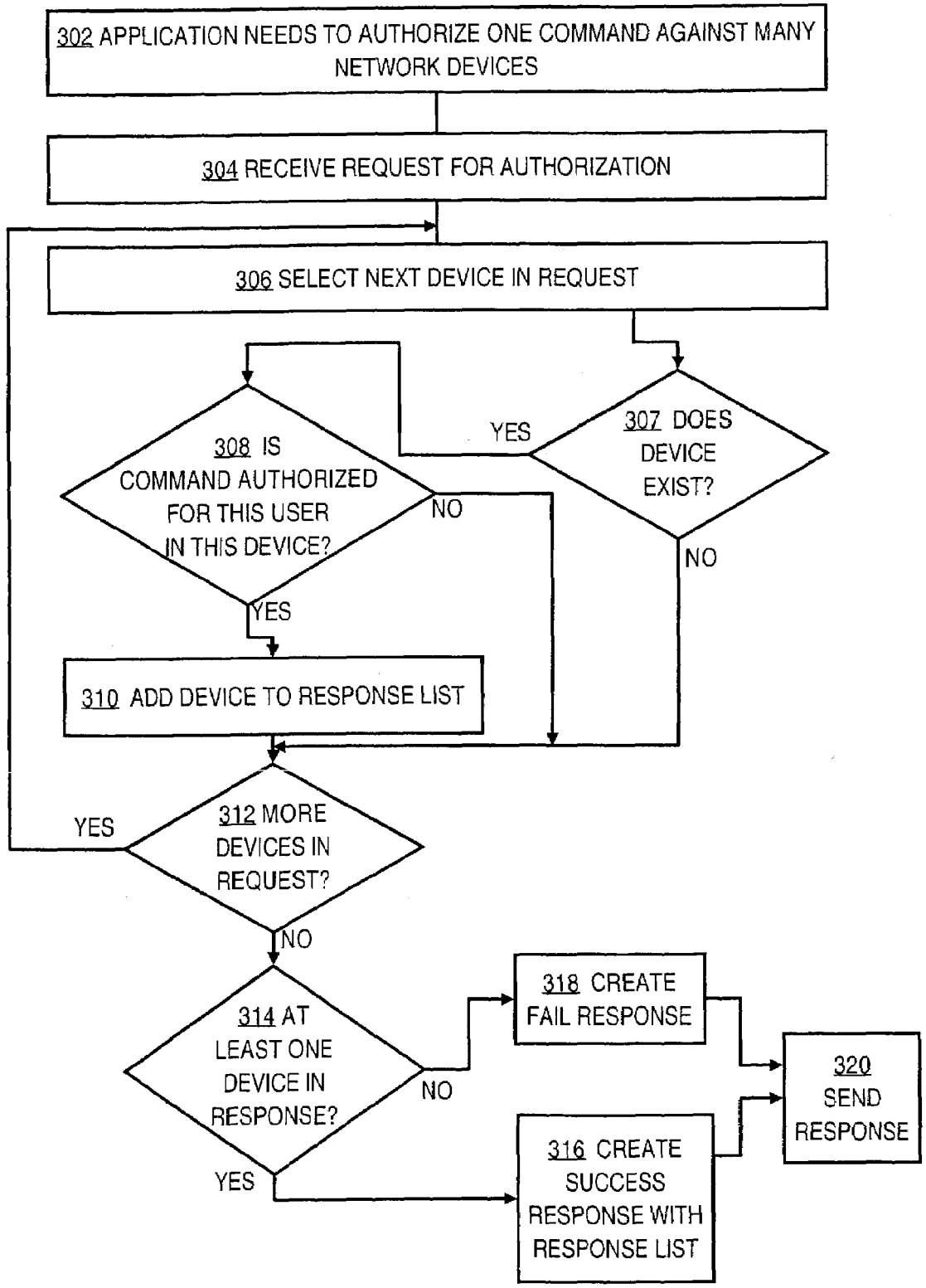
FIG. 3 is a flow diagram of a process for authorizing a command against many network devices.

FIG. 3 is a flow diagram of a process for authorizing a application task against many network devices. As indicated in block 302, the process of FIG. 3 is appropriate when an application needs to authorize one application task against many network devices. In block 304, a request for authorization is received. The request specifies a user, service, a plurality of devices, and a single application task with one or more arguments. In one specific embodiment that uses TACACS+, the request has the following format:

user=<User Logged on the NM application>
    service=<Application Service Name>
    authorize-device*device1
    authorize-device*device2
    . . .
    authorize-device*deviceN
    cmd=cmd1
    cmd-arg=arg1
    cmd-arg=arg2
    . . .
    cmd-arg=argN In a request with this format, "user" identifies a user who is logged on to a network management application, "service" identifies the network management application or a service within it, "device1" through "deviceN" identify network devices, "cmd1" is an application task, and "cmd1-arg1" through "cmd1-argN" are arguments of the application task. In a particular embodiment, a large number of devices may be identified in a single request, provided that the total of all devices, commands, and command arguments in a request does not exceed 255. However, other embodiments are not subject to such limits.

In block 306, the next device specified in the request is selected. Thus, block 306 represents initiation of a loop that iterates through all devices that are specified in the request. In block 307, a test is performed to determine whether information representing the selected device exists, as specified by device definitions in AAA server 120. If the device exists, then in block 308, a test is performed to determine whether the specified application task is authorized for the specified user on the selected device. Conventional AAA authorization techniques may be used, for example, by AAA server 120.

If the specified application task is authorized for the specified user and selected device, then in block 310, the specified device is added to the response. In one embodiment that uses TACACS+, the response has the following format:

service=<service same as request>
    authorize-device=authorized_device1
    . . .
    authorize-device=authorized_deviceN
    cmd=cmd1
    cmd-arg=arg1
    cmd-arg=arg2
    . . .
    cmd-arg=argN Thereafter, control reaches block 312. Control also reaches block 312 when a specified device does not exist, as determined in block 307, and when an authorization failure occurs, in block 308. In block 312, a test is performed to determine whether the request contains additional specified devices. If so, then control passes to block 306 for consideration of the additional devices.

If all devices in the request have been processed, then in block 314, a test is performed to determine whether the response contains at least one device. If the response has no devices, then in block 318, a Fail response is created. If at least one device is in the response, then in block 316, a Success response is created with a list of devices. In block 320, the response is sent to the requesting process.

In embodiments that use TACACS+, the request specified above can specify a maximum of about 240 devices in a single request, because of limitations on the number of attributes allowed per TACACS+ packet. While the TACACS+ protocol conceivably could be modified to increase the number of allowed attributes, this approach is considered impractical because of the large installed base of systems that use TACACS+ in its current form. However, network management applications typically manage thousands of devices, and an authorization for a thousand devices would take four round trips of messages; thus, the limit of about 240 devices also poses problems. Accordingly, in a related approach, the request described above with respect to FIG. 3 may specify one or more administrative device groups as defined on the TACACS+ server. In this approach, a network management application obtains group definitions and contents from the TACACS+ server before employing device group based authorization.

Further, in this approach, to authorize a application permissions against a set of network device groups, the following request format is used:

user=<User Logged on the NM application>
    service=<Application Service Name>
    authorize-deviceGroup*deviceGroup1
    authorize-deviceGroup*deviceGroup2
    . . .
    authorize-deviceGroup*deviceGroupN
    cmd=cmd1
    cmd-arg=arg1
    cmd-arg=arg2
    . . .
    cmd-arg=argN The values "deviceGroup1" through "deviceGroupN" identify one or more device groups from among the device groups that are defined in the AAA server. A maximum of 253 device groups may be specified in a single request, but if the device groups are configured properly on the AAA server, this limit is considered acceptable for management of even very large networks. In this approach the TACACS+ response has the following format:

service=<service same as request>
    authorize-deviceGroup*authorized_deviceGroupN
    . . .
    authorize-deviceGroup=authorized_deviceGroupN
    cmd=cmd1
    cmd-arg=arg1
    cmd-arg=arg2
    . . .
    cmd-arg=argN A similar approach may be used for authorizing a application task for a single device.

Thus, in one embodiment, the TACACS+ protocol provides a standard query mechanism for authorization decisions. Two basic query mechanisms are supported. First, the management station can query all tasks or sub-tasks an application can perform. This query mechanism is useful for applications that pre-fetch authorization information. Typically, UI based authorization is pre-fetched and a user is only shown the jobs that he is authorized to perform. The second authorization interface allows a user to determine the devices against which a certain task can be performed. This query is run on a task-by-task basis. For a certain task, the management station sends TACACS+ queries for all the network device groups to determine the device groups on which the user can perform the task. Once the management station has the list of authorized network device groups, it expands the device groups locally based on the network device group definitions that were imported from the AAA server.

Fetching task lists and device lists from the AAA server using the TACACS+ protocol may introduce delay in processing a user request. In an alternative approach, an offline process is created that will perform such queries as a background process. This allows an application to query at any time for a relatively current list of tasks possible for a user.

3.0 APPROACHES FOR ENFORCING SECURITY IN A MANAGEMENT DOMAIN 3.1 General Architectural Concepts In one approach for providing security in a management domain consisting of a plurality of distributed management stations, an AAA server provides centralized security services for the management domain. For example, a CiscoSecure Access Control Server (ACS) may serve as a central AAA server for the management domain. The TACACS+ protocol can be used as transport for access to the ACS; alternatively, RADIUS may be used.

In this approach, user identity management is provided. Consistency in definition of users and credentials, and enforcing a single identity of the user in the network, is desirable in providing management domain security. In one embodiment, the AAA server provides identity management. Each user has one identity that is specified by a TACACS+ username.

Role based access control is enforced by the AAA server. In this context, roles are a collection of tasks. Administrators may create, edit and view roles. Roles are unique per application. In this context, an application broadly refers to the management tasks of a single management station or a collection of similar management stations. Definition of an application is flexible and a certain management station can have multiple applications with each application containing a logical set of tasks. Administrators can assign users or groups of users to perform different roles on different groups of devices.

The grouping of users and devices that is natively provided by an AAA server provides ease of administration for security in the management domain. A user can perform only one role on a group of devices per application. Since authorization occurs on a per application basis, management stations can obtain multiple levels of granularity based on the mapping of their services to applications. Granularity of authorization also depends upon how the management stations define their tasks and subtasks for an application.

The administrative user interface provided by the AAA server is used for administration and management of users and roles. An administrator may add new users and define new roles using the AAA server console. An interface or editor is provided to map tasks to roles, for defining and editing roles. Applications register tasks and subtasks using an XML interface. Registered tasks and subtasks are associated with roles using the task editor, thereby defining roles.

When roles have been defined, the administrative user interface of the AAA server enables the administrator to define the roles a user can perform on a device or group of devices. In this context, "devices" refers to both network devices, as well as the network management system, system tasks such as management reports, system management tasks, etc., that operate on the network management system. Custom roles may be defined for an application, and a management station can export custom role definitions to the AAA server during deployment, after which an administrator can edit the custom role definitions.

AAA servers conventionally support grouping devices into Network Device Groups for ease of administration, and each device can be part of only one Network Device Group. Typically, authorization policies are defined for each network device group, and often TACACS+ authorization queries may be used for network device groups instead of querying per device. Accordingly, a security framework may utilize the network device groups to improve the efficiency of the query mechanism. The security framework imports the Network Device Group definitions from the AAA and stores the definitions locally. The imported network device group information contains all network device group names and device records for all devices in each network device group. A device record contains a unique name, such as the DNS name for actual devices registered with the DNS, and the IP address of the device. The AAA server may support virtual devices that enable the security framework to provide authorization for network interfaces, virtual IP addresses and service level agreements (SLAs). Since the application authorization query uses network device groups, there is no requirement for a unique device identifier common to the AAA server and the management station.

3.3 Synchronizing Device Information

Device information is synchronized between the management stations and AAA server, since management stations are authorized to perform management tasks on devices secured by the AAA server. In a first approach, when the AAA server is already in the network and a new management station is installed, the management station imports the network device group definitions from the AAA server. The imported data contains all network device groups and all devices part of each network device group. Any new devices added or discovered by the management station are exported to the AAA server.

In a second approach, when both a new AAA server and management station are present in the network, then the management station discovers the network, and the resulting device list is exported to the AAA server by the management station.

In both approaches, any new devices that are added or discovered by the management station are synched with the AAA server. Management stations would provide a mechanism to trigger an import of new device groups added to the AAA server. Device exports from management stations to the AAA server are done transparently, but network device group imports from the AAA server to the management station would have to be manually triggered.

Devices send accounting records to the AAA server and changes in the network are audited at the AAA server. Audit logs at the management stations are synchronized with the audit logs and the user is provided with a single audit repository. IPSec may be employed to create secure tunnels from the management stations to the ACS server.

3.4 User Identity Model

Two basic models for user identity may be used. In a first approach, a single user identity is present in the network. In a second d approach, dual identities are used.

In the first approach, a single user identity is used in the network. The identity comprises the username presented at logon. The single user identity is the basis for application authorization. The same username is used to access a device. In this approach, application tasks are decomposed to device commands and sent to the device. Since administrators generally are not aware of the mapping between application tasks and device commands, an administrator could authorize the user to run an application task, but disallow the user from running the corresponding device commands. This would result in the failure of the application task, and the user would have no way to find out the reason for failure since the user is not aware of the device commands corresponding to that task.

This problem is solved by making the administrator aware of all the device commands that are part of any particular application task. In a first solution, an error message is shown to the user if a telnet command authorization fails. The error message shows the exact device command, and prompts the user to resolve the inconsistency by modifying the associated policy at the AAA server. The message suggests authorizing the user to perform the device command or disallow access to the application task. The error message may have a hyperlink that can contain a list of the device commands that are part of that task. The application registers a task-to-command mapping at the management station.

In a second solution, applications register device commands to task mapping as part of the task registry. The task-to-command mapping is exported to the AAA server. The role definition user interface or task editing process is provided with a function that shows the device commands that form part of a task. The administrator can use that information and define consistent device and application authorization policies.

In the dual identity model, two separate user identities are employed. The username presented at logon is used for authorization of application tasks, but an "admin" user is used for device access. The "admin" user is authorized to perform all device commands; therefore, to define consistent policies, it is assumed that the administrator knows the mapping of application tasks to device commands. In this approach, a user can perform certain tasks from the management station that the user may not be able to perform via device CLI access.

In the dual identity approach, a consistent audit trail is not generated, because user identity is not maintained in the network. For example, an application task may create an accounting record with a certain username, but the equivalent device commands will create accounting records that identify the "admin" user. These accounting records need to be reconciled to create a consistent audit trail. In one approach, the transport API used to transport device commands to the device is extended to support a delegated transport that receives two sets of user credentials. A first credential set contains the username of the actual user that has logged on, and the second set contains the username and password of the "admin" user. Further, in addition to its normal operations, the transport API sends a TACACS+ accounting record to the AAA server for the device command after the command executes successfully on the device. The TACACS+ accounting record is sent with the actual username. Thus, two TACACS+ accounting records are sent to the AAA server, and the AAA server maintains the accounting record from the device in a separate log. The application audit log has a consistent audit trail that contains both the application tasks and device commands.

3.5 Security Services

Strong security is an important requirement for distributed management. Multiple communication links need to be secured, and each of these communication links has unique security requirements.

First, Browser to Management Station security may be provided using Secure Sockets Layer or Transfer Layer Security ("SSL/TLS") protocol. A self-signed SSL certificate is present by default. A startup daemon generates the self-signed certificate before starting the web server, if none is found. SSL certificates and their protected key files may be installed on the management station from a remote location. The certificates are loaded at bootstrap and during certificate renewal.

Management station to device security is also provided. Multiple transport options are available for management access to devices, for example, Simple Network Management Protocol (SNMP), Telnet, RSH/RCMD, etc. IPSec provides a seamless mechanism to provide strong security that encompasses all such transport mechanisms. IPSec encapsulating payload (ESP) mode is used for protection of confidentiality, and the key exchange is secured using shared secrets. An administrative user interface is provided to configure IPSec clients on management stations and IPSec device configuration. Alternatively, Secure Shell (SSH) or TLS/SSL may be used for secure communication from management station to devices.

Security in communications among management stations may involve communication links between two similar or dissimilar management stations. Communication between management stations may use HTTP, as one example, an event bus approach, or other mechanisms. Two approaches may be used for strong security in inter-management station communication: TLS/SSL, or shared secrets. When HTTP is the transport mechanism for bulk data transfer between management stations, TLS/SSL can be employed to secure HTTP exchanges. TLS/SSL may be used in mutual authentication mode.

Alternatively, a shared secret approach can provide inter-management station security. Shared secrets provide origin authentication for management stations. Symmetric key algorithms such as the American Encryption Standard (AES) or Twofish may be employed to provide data confidentiality. Shared secrets can be configured for every management station pair, which would result in $Nx(N-1)$ shared secrets, or a group of management stations can use the same shared secrets. Management stations have an administrative interface to configure the trust model and define shared secrets. By default, shared secret configuration for a management station is allowed only via the console. In another approach, shared secrets may be synchronized with trusted management stations via a network.

Management stations use API calls to configure the security mechanisms to be used for inter management station communication. SSL/TLS library calls are wrapped around API calls that abstract the SSL library calls. This provides forward extensibility to allow new mechanisms to be integrated without actual modification to application code.

Credential caching may be used. For example, assume that a user session is initiated when a user logs onto the management station via the browser. During the session, a user can execute tasks on the management station that might result either in executing a command on a device, or in executing or scheduling a task on a remote management station. In both cases, the command or task has to be executed in the context that has logged in via the web. This is achieved by caching the user credentials on the management station once a user logs on.

In one approach, the cached credential is a username/password that is hashed and stored on disk. One cached credential token is present per user session on the management station. The management station retrieves this cached credential token from the disk and passes the username/password to the device or remote management station. The device or remote management station uses the username/ password to re-authenticate the user with the AAA server. The cached credential token on the local or any remote management station is destroyed when the user logs out, or based on a timeout during a long user session. Job scheduling on the local or remote management station during a user session results in an additional copy of the cached credential token, which is used only by the scheduled job. The cached credential token is destroyed at the end of the scheduled job.

3.6 TLS/SSL Approach

Figure 4:
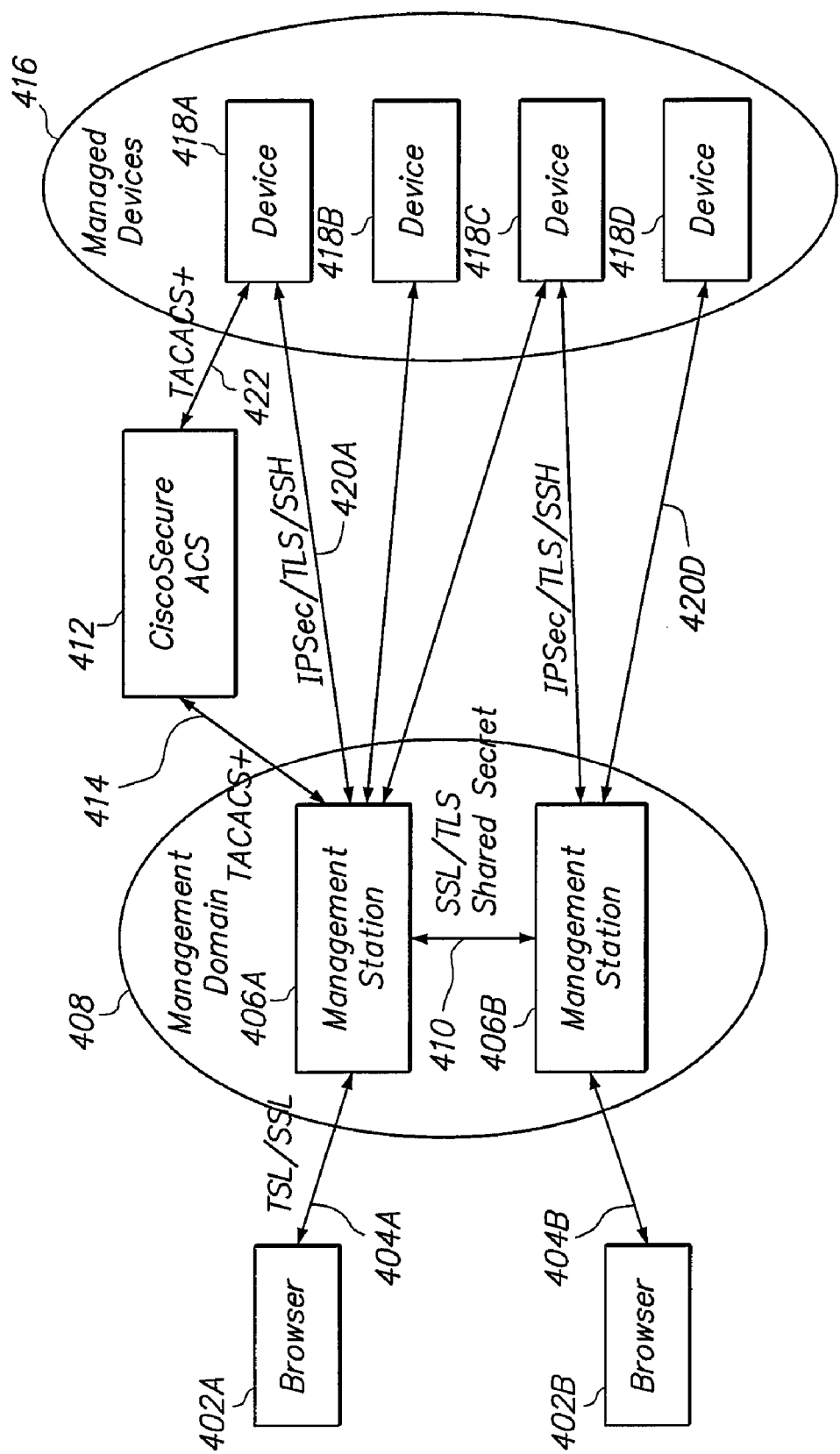
FIG. 4 is a block diagram of a network arrangement providing secure communication among distributed management stations.

FIG. 4 is a block diagram of an arrangement for providing security in a management domain having a plurality of management stations, using a TLS/SSL approach. One or more clients or browsers 402A, 402B are coupled by respective communication links 404A, 404B to management stations 406A, 406B that are located within a secure management domain 408. Browsers 402A, 402B use TLS/SSL for secure communication with management stations 406A, 406B over links 404A, 404B.

Each management station can establish a connection 414 to an AAA server 412. Management stations sent authorization requests to AAA server 412 using TACACS+ messages. Alternatively, RADIUS can be used.

Each management station also is communicatively coupled to one or more network devices 418A-418D in a network 416 of managed devices. In one approach, the management stations 406A, 406B establish secure IPSec tunnels with devices 418A-418D for communicating management information. Alternatively, TLS/SSH is used. Devices 418A-418D can communicate with AAA server 412 using TACACS+ requests. Alternatively, RADIUS can be used.

To illustrate an operational example, assume that a user logs in using browser 402A to access a management user interface of a management station 406A. Assume that the user wants to schedule a job on a remote appliance that involves executing a set of device commands on device 418A. The user logs out once he has scheduled the job. The following process may be used to accomplish this general procedure.

A user at browser 402A logs on to management station 406A by entering a username and password. Management station 406A authenticates the user to AAA server 412 using TACACS+ messages. The username/password is stored in a session credentials cache. Management station 406A displays a menu of tasks that he is authorized to perform. The user decides to run a scheduler task. When the scheduler is invoked, the scheduler lists tasks that the user can schedule, and the devices against which the task can be scheduled. The user schedules a task on a remote appliance; the task involves running a set of commands on the selected devices.

Management station 406A passes the user credentials from the credential cache to the remote appliance. The user credentials are encrypted using the shared secret. Alternatively, management station 406A can a TLS/SSL secure socket connection to the appliance. The remote appliance decrypts the user credentials using the shared secret, or reads the data from the secure socket. The shared secret, or the TLS/SSL exchange, mutually authenticates the appliance. On successful decryption, the remote appliance re-authenticates the user. If the user authentication succeeds, the user credentials are stored in the scheduler credential cache. The user logs out, and the local appliance destroys the credential cache associated with that user session.

At the scheduled time, the remote appliance runs the scheduled job. The remote appliance uses the telnet API to run commands on the devices 418A-418D. The remote appliance retrieves the TACACS+ username and password from the cached credential, and passes the username and password to the telnet API. The devices re-authenticate the user using the username and password. The remote appliance destroys the cached credentials upon completion of the job. IPSec tunnels may be opened to select devices to provide strong security for device access.

3.7 Kerberos Approach

Figure 5:
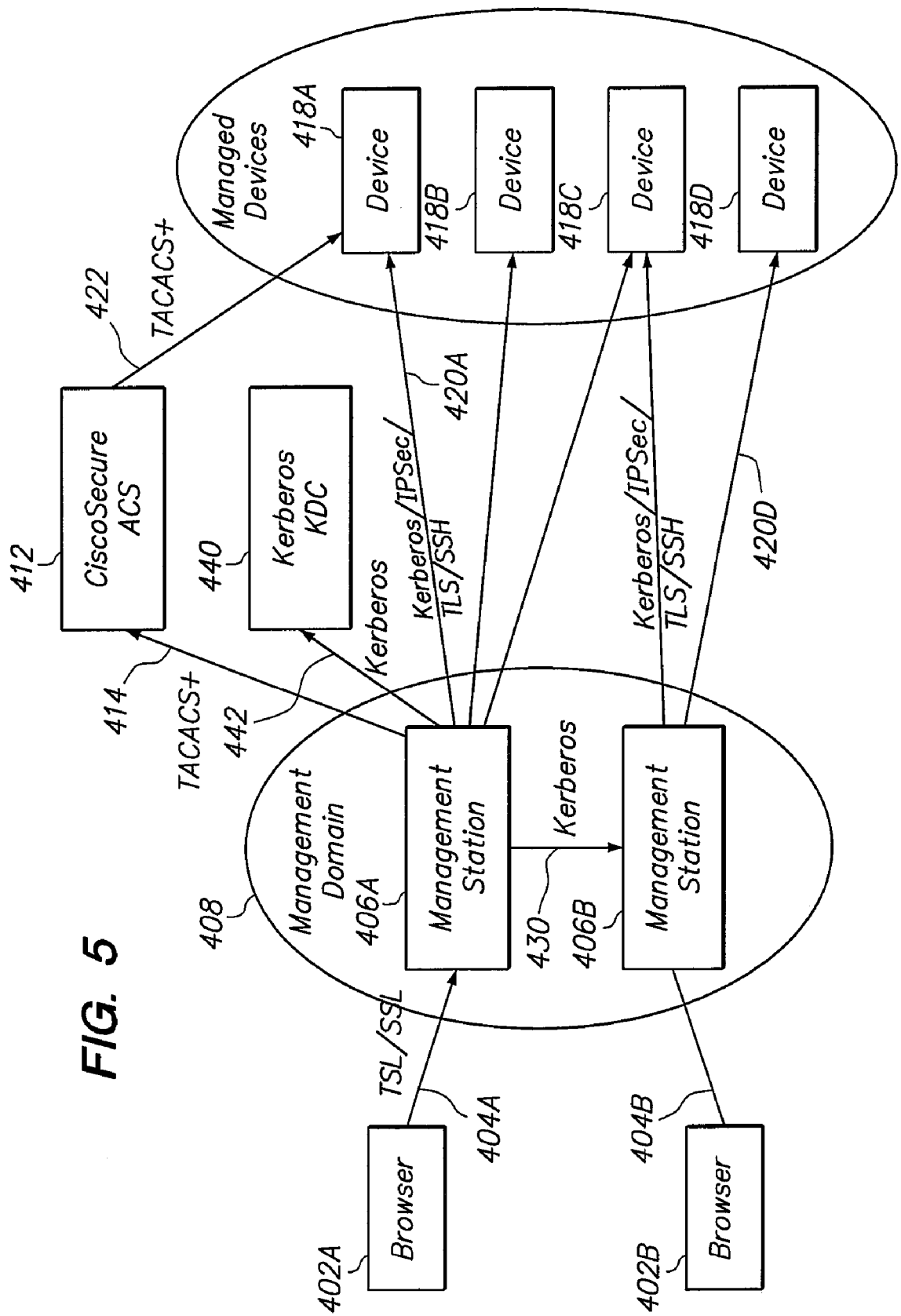
FIG. 5 is a block diagram of an alternative network arrangement providing secure communication among distributed management stations.

In an alternative approach, the Kerberos key management protocol is used. FIG. 5 is a block diagram of a network arrangement that uses Kerberos. As in FIG. 4, browsers 402A, 402B communicate with TLS/SSL over links 404A, 404B to respective management stations 406A, 406B in management domain 408. However, management stations communicate using Kerberos on link 430. As in FIG. 4, management stations 406A, 406B may communicate with managed devices 418A-418D using an IPSec tunnel, or TLS/SSL. In addition, Kerberos may be used for such communication.

A Kerberos Key Distribution Center (KDC) 440 is provided and communicates with one or more of the management stations 406A, 406B using Kerberos over link 442.

In this arrangement, Kerberos is used for authentication, and TACACS+ is used to communicate authorization requests and auditing information to the AAA server 412. An administrator performs user and role administration at the AAA server 412. Authorization policies are defined at the AAA server 412. A user database maintained by AAA server 412 is periodically synchronized with a principal database maintained by the Kerberos KDC 440.

The Kerberos principal database of KDC 440 is transparent to applications and end users, since they use the AAA server 412 for User and Role Administration and Authorization policy definition. Once the Kerberos KDC is set up, to look up the same set of users as the AAA server 412, user authentication is performed against the KDC. On successful authentication, the user acquires a Ticket Granting Ticket (TGT), which is used for single sign-on. Kerberos eliminates the re-authentication required in the TLS/SSL approach described above; instead, management stations single sign on to devices by opening a Kerberos telnet session. In such a hybrid authentication approach, a host service principal ticket is passed to a device, and the device uses the same identity to authorize against a TACACS+ server. Single sign-on between appliances is achieved by service authentication of the host principal. Kerberos also provides an efficient mechanism for credentials delegation and provide strong data object security.

Strong security for management station to device communication for SNMP traffic would employ IPSec or TLS/SSL and strong security for non-IOS devices would employ IPSec, SSH or TLS/SSL.

To illustrate operation of the arrangement of FIG. 5, assume that a user of browser 402A logs on to management station 406A by entering a username and password. The management station 406A authenticates the user with the Kerberos KDC 440. Upon successful authentication, a Kerberos Ticket Granting Ticket (TGT) is returned to the management station 406A from the KDC 440.

Management station 406A then displays the tasks that the user is authorized to perform. The user elects to run the scheduler task. The scheduler displays a list of tasks that the user can schedule and the devices against which the task can be scheduled. The user schedules the task on a remote appliance. The task involves running a set of commands on selected devices.

The user credentials are delegated to the remote appliance using Kerberos credential delegation, by TGT forwarding. The remote appliance can now pose as the user and obtain service principal tickets for device access. The appliances are authenticated to each other, and share a session key that is used to encrypt the forwarded TGT. The local appliance destroys the TGT once the user logs out.

At the scheduled time, the remote appliance runs the scheduled job. The remote appliance uses the Kerberos telnet API to run the commands on the devices 418A-418D. The remote appliance receives a host service principal ticket for each remote device 418A-418D using the forwarded TGT. A Kerberos telnet session is opened and the telnet commands are passed to the devices. The devices use the user identity present in the host service principal ticket, which identifies the user who had logged on, to authorize the telnet commands with the AAA server. The remote appliance destroys the forwarded TGT once the scheduled jobs are completed.

4.0 IMPLEMENTATION MECHANISMS—HARDWARE OVERVIEW

Figure 6:
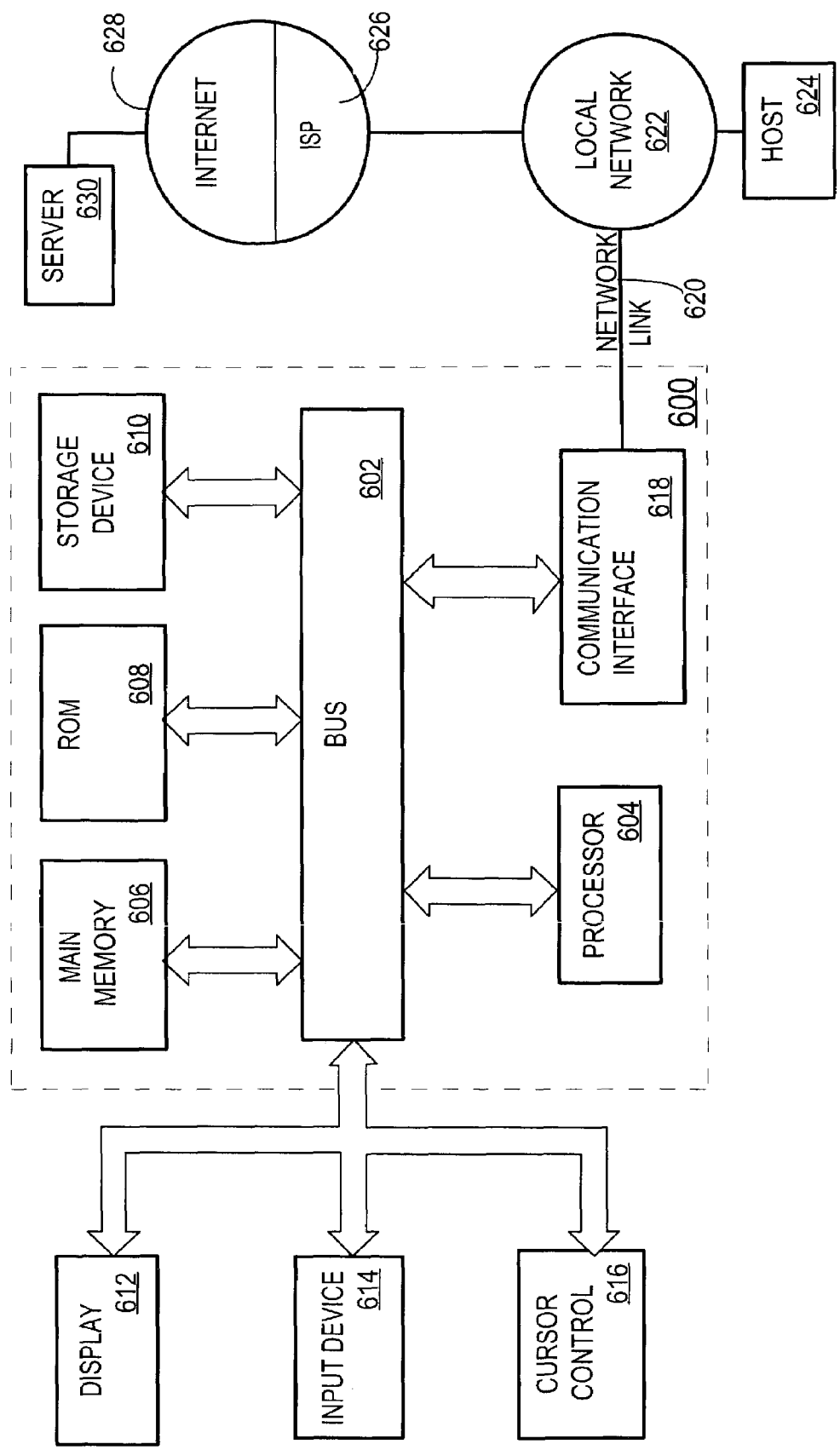
FIG. 6 is a block diagram that illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, trackball, stylus, or cursor direction keys for communicating direction information and command selections to processor 604 and for controlling cursor movement on display 612. This input device typically has two degrees of freedom in two axes, a first axis (e.g.,-x) and a second axis (e.g., y), that allows the device to specify positions in a plane.

The invention is related to the use of computer system 600 for authorizing network device operations that are requested by applications. According to one embodiment of the invention, authorizing network device operations that are requested by applications is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for authorizing network device operations that are requested by applications as described herein.

The received code may be executed by processor 604 as it is received, and/or stored in storage device 610, or other non-volatile storage for later execution. In this manner, computer system 600 may obtain application code in the form of a carrier wave.

5.0 EXTENSIONS AND ALTERNATIVES

In the foregoing specification, the invention has been described with reference to specific embodiments thereof. It will, however, be evident that various modifications and change may be made thereto without departing from the broader spirit and scope of the invention. The specification and drawings are, accordingly, to be regarded in an illustrative rather than a restrictive sense.

What is claimed is:

1. A method of authorizing network device operations that are requested by applications, the method comprising the computer-implemented steps of:
   receiving a request for authorization from a network management application, wherein the request for authorization identifies:
   a user who is using the network management application to interact with a network device,
   the network management application seeking to execute a plurality of application tasks on the network device,
   the network device, and
   the application tasks;
   determining whether the user is authorized to execute the application tasks on the network device;
   sending a success response message to the requesting application only when the specified user is authorized to execute all tasks in the plurality of application tasks on the network device.

2. A method as recited in claim 1,
   wherein the request identifies a network device group, and
   wherein the sending step comprises the steps of sending a success response message to the requesting application only when the specified user is authorized to execute the plurality of application tasks on the network device group.

3. A method as recited in claim 1,
   wherein the request identifies a network device group of any,
   wherein the determining step comprises determining whether the specified user is authorized to execute the plurality of application tasks on any network device group that is then currently defined in an access control server, and in a context of the specified application, and
   wherein the sending step comprises sending a success response message to the requesting application only when the specified user is authorized to execute the plurality of application tasks on at least one then-currently defined network device group.

4. A method as recited in claim 1,
   wherein the request identifies a network device group of any,
   wherein the determining step comprises determining whether the specified user is authorized to execute the plurality of application tasks on any network device group that is then currently defined in an access control server, and
   wherein the sending step comprises sending a failure response message to the requesting application when the specified user is not authorized to execute the plurality of application tasks on any then-currently defined network device group.

5. A method as recited in claim 1, wherein the success response message identifies the user, the network management application, the network device, and the plurality of application tasks.

6. A method as recited in claim 1, wherein the request and the success response message are TACACS+ messages.

7. A method as recited in claim 1, wherein the request and the success response message are RADIUS messages.

8. A method as recited in claim 1,
   wherein the determining step comprises determining whether the specified user is authorized to execute the plurality of application tasks on the network device in a context of the specified application; and
   wherein the sending step comprises sending a success response message to the requesting application only when the specified user is authorized to execute the plurality of application tasks on the network device in the context of the specified application.

9. A method as recited in claim 1 wherein the receiving, determining and sending steps are performed by an authentication, authorization, and accounting (AAA) server.

10. A method of authorizing network device operations that are requested by applications, the method comprising the computer-implemented steps of:
    receiving a request for authorization from a-network management application, wherein the request for authorization identifies:
    a user seeking to execute a plurality of application tasks on a plurality of network devices,
    the network management application,
    the network devices, and
    the application tasks;
    determining whether the user is authorized to execute the application tasks on all the network devices in a context of the specified application;
    sending a success response message to the requesting application only when the user is authorized to execute the application tasks on all the network devices in the context of the specified application;
    wherein the success response identifies each of the network devices for which the specified user is authorized to execute the application tasks.

11. A method as recited in claim 10,
    wherein the request is a TACACS+ message,
    wherein the request identifies a network device group, and
    wherein the request indirectly identifies greater than 253 network devices by specifying a plurality of network device groups to which the network devices belong.

12. A method as recited in claim 10,
    wherein the request identifies one or more network device groups, and wherein the sending step comprises the steps of sending a success response message to the requesting application only when the specified user is authorized to execute the plurality of application tasks on one or more of the network device groups in the context of the specified application.

13. A method as recited in claim 10, wherein the success response message identifies the user, the network management application, the plurality of network devices for which the user is authorized to execute the application task, and the application tasks.

14. A method as recited in claim 10, wherein the request and the success response message are TACACS+ messages.

15. A method as recited in claim 10 wherein the receiving, determining and sending steps are performed by an authentication, authorization, and accounting (AAA) server.

16. A method as recited in claim 10, wherein the request and the success response message are RADIUS messages.

17. A method as recited in claim 10,
wherein the determining step comprises determining whether the specified user is authorized to execute the application task on the one or more network devices in the context of the specified application; and
wherein the sending step comprises sending a success response message to the requesting application only when the specified user is authorized to execute the application task on the one or more network devices in the context of the specified application.

18. A computer-readable storage medium carrying one or more sequences of instructions for authorizing network device operations that are requested by applications, which instructions, when executed by one or more processors, cause the one or more processors to carry out the steps of:
receiving a request for authorization from a network management application, wherein the request for authorization identifies:
a user who is using the network management application to interact with a network device,
the network management application seeking to execute a plurality of application tasks on the network device, and
the network device, and
the plurality of application tasks;
determining whether the user is authorized to execute the plurality of application tasks on the network device;
sending a success response message to the requesting application only when the specified user is authorized to execute all of the plurality of application tasks on the network device.

19. An apparatus for creating and storing troubleshooting information for authorizing network device operations that are requested by applications, comprising:
means for receiving a request for authorization from a network management application, wherein the request for authorization identifies:
a user who is using the network management application to interact with a network device,
the network management application seeking to execute a plurality of application tasks on a network device,
the network device, and
the plurality of application tasks;
means for determining whether the user is authorized to execute the plurality of application tasks on the network device;
means for sending a success response message to the requesting application only when the specified user is authorized to execute all of the plurality of application tasks on the network device.

20. The apparatus as recited in claim 19, wherein the request identifies a network device group, and wherein the sending means comprises means for sending a success response message to the requesting application only when the specified user is authorized to execute the plurality of application tasks on the network device group.

21. The apparatus as recited in claim 19, wherein the request identifies a network device group of "any," wherein the determining means comprises means for determining whether the specified user is authorized to execute the plurality of application tasks on any network device group that is then currently defined in an access control server, and in a context of the specified application, and wherein the sending means comprises means for sending a success response message to the requesting application only when the specified user is authorized to execute the plurality of application tasks on at least one then-currently defined network device group.

22. The apparatus as recited in claim 19, wherein the request identifies a network device group of "any," wherein the determining means comprises means for determining whether the specified user is authorized to execute the plurality of application tasks on any network device group that is then currently defined in an access control server, and wherein the sending means comprises means for sending a failure response message to the requesting application when the specified user is not authorized to execute the plurality of application tasks on any then-currently defined network device group.

23. The apparatus as recited in claim 19, wherein the success response message identifies the user, the network management application, the network device, and the plurality of application tasks.

24. The apparatus as recited in claim 19, wherein the request and the success response message are TACACS+ messages.

25. The apparatus as recited in claim 19, wherein the request and the success response message are RADIUS messages.

26. The apparatus as recited in claim 19, wherein the determining means comprises means for determining whether the specified user is authorized to execute the plurality of application tasks on the network device in a context of the specified application; and wherein the sending means comprises means for sending a success response message to the requesting application only when the specified user is authorized to execute the plurality of application tasks on the network device in the context of the specified application.

27. An apparatus for authorizing network device operations that are requested by applications, comprising:
a network interface that is coupled to a data network for receiving one or more packet flows therefrom;
a processor;
one or more stored sequences of instructions which, when executed by the processor, cause the processor to carry out the steps of:
receiving a request for authorization from a network management application, wherein the request for authorization identifies:
a user who is using the network management application to interact with a network device,
the network management application seeking to execute a plurality of application tasks on a network device, the network device, and
plurality of application tasks;
determining whether the user is authorized to execute the plurality of application tasks on the network device;
sending a success response message to the requesting application only when the specified user is authorized to execute all of the plurality of application tasks on the network device.

28. The apparatus as recited in claim 27,
wherein the request identifies a network device group, and
wherein the sending step comprises the steps of sending a success response message to the requesting application only when the specified user is authorized to execute the plurality of application tasks on the network device group.

29. The apparatus as recited in claim 27, wherein the request identifies a network device group of "any," wherein the instructions for determining comprise instructions which when executed cause determining whether the specified user is authorized to execute the plurality of application tasks on any network device group that is then currently defined in an access control server, and in a context of the specified application, and wherein the instructions for sending comprise instructions which when executed cause sending a success response message to the requesting application only when the specified user is authorized to execute the plurality of application tasks on at least one then-currently defined network device group.

30. The apparatus as recited in claim 27, wherein the request identifies a network device group of "any," wherein the instructions for determining comprise instructions which when executed cause determining whether the specified user is authorized to execute the plurality of application tasks on any network device group that is then currently defined in an access control server, and wherein the instructions for sending comprise instructions which when executed cause sending a failure response message to the requesting application when the specified user is not authorized to execute the plurality of application tasks on any then-currently defined network device group.

31. The apparatus as recited in claim 27, wherein the success response message identifies the user, the network management application, the network device, and the plurality of application tasks.

32. The apparatus as recited in claim 27, wherein the request and the success response message are TACACS+ messages.

33. The apparatus as recited in claim 27, wherein the request and the success response message are RADIUS messages.

34. The apparatus as recited in claim 27, wherein the instructions for determining comprise instructions which when executed cause determining whether the specified user is authorized to execute the plurality of application tasks on the network device in a context of the specified application; and wherein the instructions for sending comprise instructions which when executed cause sending a success response message to the requesting application only when the specified user is authorized to execute the plurality of application tasks on the network device in the context of the specified application.

* * * * *